(12) United States Patent
Oksanen et al.

(10) Patent No.: US 7,782,894 B2
(45) Date of Patent: Aug. 24, 2010

(54) ULTRA-WIDEBAND/LOW POWER COMMUNICATION HAVING A DEDICATED REMOVABLE MEMORY MODULE FOR FAST DATA DOWNLOADS—APPARATUS, SYSTEMS AND METHODS

(75) Inventors: Markku A. Oksanen, Helsinki (FI); Harald Kaaja, Helsinki (FI)

(73) Assignee: Nokia Corporation, Espoo (FI)

( * ) Notice: Subject to any disclaimer, the term of this patent is extended or adjusted under 35 U.S.C. 154(b) by 1752 days.

(21) Appl. No.: 10/660,634

(22) Filed: Sep. 12, 2003

(65) Prior Publication Data

US 2005/0058152 A1 Mar. 17, 2005

(51) Int. Cl.
*H04J 3/16* (2006.01)
(52) U.S. Cl. ...................................... 370/465
(58) Field of Classification Search ........................ None
See application file for complete search history.

(56) References Cited

U.S. PATENT DOCUMENTS

| | | | | |
|---|---|---|---|---|
| 5,239,678 | A | * | 8/1993 | Grube et al. ................. 455/511 |
| 5,307,370 | A | | 4/1994 | Eness |
| 5,677,927 | A | | 10/1997 | Fullerton et al. ............. 375/200 |
| 5,687,169 | A | | 11/1997 | Fullerton ..................... 370/324 |
| 6,021,516 | A | | 2/2000 | Okajima et al. |
| 6,144,464 | A | | 11/2000 | Rupp et al. |
| 6,172,673 | B1 | | 1/2001 | Lehtinen et al. |
| 6,349,199 | B1 | | 2/2002 | Armantrout |
| 6,507,734 | B1 | | 1/2003 | Berger et al. |
| 6,539,503 | B1 | | 3/2003 | Walker |
| 6,549,567 | B1 | | 4/2003 | Fullerton ..................... 375/219 |
| 6,556,825 | B1 | | 4/2003 | Mansfield |
| 6,571,089 | B1 | | 5/2003 | Richards et al. ............. 455/266 |
| 6,571,212 | B1 | | 5/2003 | Dent |

(Continued)

FOREIGN PATENT DOCUMENTS

CA 2443871 A1 2/2003

(Continued)

OTHER PUBLICATIONS

Walter Hirt, "Ultra-wideband radio technology: overview and future research", Computer Communications, Amsterdam, NL, vol. 26, No. 1, Feb. 2003, pp. 46-52.

(Continued)

*Primary Examiner*—Raj Jain
(74) *Attorney, Agent, or Firm*—Locke Lord Bissell & Liddell

(57) ABSTRACT

In a mobile environment, a mobile device includes an attached memory stick (removable memory) having a high speed—memory and storage with direct memory access embodied in an integrated circuit chip coupled to an ultra-wideband (UWB) transceiver. The mobile device communicates with other like base devices, portable or stationary, via UWB transmissions using pulse bursts up to 1 Gbit per second. Data transfers between the devices occur in the simplex or duplex mode, after a low power communication connection is established between the devices. The communication link between the devices is in the range of 10-20 meters. The communication system allows existing device bus interfaces (which are much slower than ultra-wideband transmissions) to communicate between the fast read/write cycles of the memories integrated within the memory stick. Duplex transmission can occur by pulse interleaving sending side transmitters and receiving side transmitters.

25 Claims, 5 Drawing Sheets

U.S. PATENT DOCUMENTS

| | | | |
|---|---|---|---|
| 6,587,949 B1 | 7/2003 | Steinberg | 713/193 |
| 6,636,749 B2 | 10/2003 | Holmes et al. | |
| 6,799,287 B1 | 9/2004 | Sharma et al. | |
| 6,915,119 B1 | 7/2005 | Konishi | |
| 6,941,132 B2 | 9/2005 | Van Lieshout et al. | |
| 6,957,086 B2 | 10/2005 | Bahl et al. | |
| 6,959,199 B2 | 10/2005 | Ohkubo et al. | |
| 6,961,541 B2 | 11/2005 | Overy et al. | |
| 6,993,343 B2 | 1/2006 | Yoshii et al. | |
| 7,010,320 B2 | 3/2006 | Komatsu | |
| 7,027,418 B2 | 4/2006 | Gan et al. | |
| 7,046,716 B1* | 5/2006 | Miao | 375/130 |
| 7,058,071 B1 | 6/2006 | Myles et al. | |
| 7,088,795 B1* | 8/2006 | Aiello et al. | 375/356 |
| 7,096,033 B1 | 8/2006 | Bell | |
| 7,103,314 B2 | 9/2006 | Li | |
| 7,135,985 B2* | 11/2006 | Woolgar et al. | 340/825.22 |
| 7,269,774 B2 | 9/2007 | Sudo et al. | |
| 7,278,084 B2 | 10/2007 | Palin et al. | |
| 2001/0007815 A1 | 7/2001 | Philipsson | |
| 2001/0049262 A1 | 12/2001 | Lehtonen | |
| 2001/0055356 A1 | 12/2001 | Davies | |
| 2002/0003792 A1 | 1/2002 | Schmidt et al. | |
| 2002/0065099 A1 | 5/2002 | Bjorndahl | |
| 2002/0073269 A1 | 6/2002 | Kawashima et al. | |
| 2002/0080866 A1 | 6/2002 | Bouet et al. | |
| 2002/0151276 A1 | 10/2002 | Ito | |
| 2002/0164997 A1* | 11/2002 | Parry | 455/456 |
| 2002/0172262 A1 | 11/2002 | Sugaya et al. | |
| 2003/0032422 A1 | 2/2003 | Wynbeek | |
| 2003/0035423 A1 | 2/2003 | Beckmann et al. | |
| 2003/0063196 A1 | 4/2003 | Palatov et al. | 348/211.2 |
| 2003/0078037 A1 | 4/2003 | Auckland et al. | |
| 2003/0100288 A1 | 5/2003 | Tomlinson, Jr. et al. | |
| 2003/0108010 A1 | 6/2003 | Kim et al. | |
| 2003/0137966 A1 | 7/2003 | Odman et al. | |
| 2003/0147453 A1 | 8/2003 | Bantra | |
| 2003/0148767 A1 | 8/2003 | Sugaya et al. | |
| 2003/0156589 A1 | 8/2003 | Suetsugua | |
| 2003/0174048 A1 | 9/2003 | McCorkle | |
| 2003/0203741 A1 | 10/2003 | Matsuo et al. | |
| 2003/0232620 A1 | 12/2003 | Runkle et al. | |
| 2004/0008617 A1 | 1/2004 | Dabak | |
| 2004/0066762 A1 | 4/2004 | Alastalo | |
| 2004/0147223 A1 | 7/2004 | Cho | |
| 2004/0151109 A1 | 8/2004 | Batra et al. | |
| 2004/0153676 A1* | 8/2004 | Krantz et al. | 713/300 |
| 2004/0204076 A1 | 10/2004 | Kotzin | |
| 2004/0214568 A1 | 10/2004 | Anderson | |
| 2004/0219897 A1 | 11/2004 | Choi | |
| 2004/0235468 A1 | 11/2004 | Luebke et al. | |
| 2005/0031051 A1 | 2/2005 | Rosen et al. | |
| 2005/0037775 A1 | 2/2005 | Moeglein et al. | |
| 2005/0048918 A1 | 3/2005 | Frost et al. | |
| 2005/0058107 A1* | 3/2005 | Salokannel et al. | 370/338 |
| 2005/0058116 A1* | 3/2005 | Palin et al. | 370/345 |
| 2005/0059345 A1 | 3/2005 | Palin et al. | |
| 2005/0068965 A1 | 3/2005 | Lin et al. | |
| 2005/0078598 A1 | 4/2005 | Batra et al. | |
| 2005/0097408 A1 | 5/2005 | Palin et al. | |
| 2005/0099943 A1 | 5/2005 | Naghian et al. | |
| 2005/0193309 A1 | 9/2005 | Grilli et al. | |
| 2005/0266808 A1 | 12/2005 | Reunamaki et al. | |
| 2005/0282494 A1 | 12/2005 | Kossi et al. | |
| 2005/0283207 A1 | 12/2005 | Hochmair et al. | |
| 2006/0036922 A1 | 2/2006 | Hong et al. | |
| 2007/0083922 A1 | 4/2007 | Reiner | |

FOREIGN PATENT DOCUMENTS

| | | |
|---|---|---|
| CN | 1496020 A | 12/2004 |
| DE | 10140446 A1 | 3/2003 |
| EP | 099717 A2 | 5/2000 |
| EP | 0999717 A2 | 5/2000 |
| EP | 1 185 033 A1 | 3/2002 |
| EP | 1274194 A1 | 1/2003 |
| EP | 1387530 | 2/2004 |
| EP | 1515473 A2 | 3/2005 |
| GB | 2 287 383 | 9/1995 |
| WO | WO 99/38302 | 7/1999 |
| WO | WO 99/41876 | 8/1999 |
| WO | WO 01/45319 | 6/2001 |
| WO | WO 02/21746 A2 | 3/2002 |
| WO | 2002/082291 | 10/2002 |
| WO | 03081846 A1 | 2/2003 |
| WO | 2003/024036 | 3/2003 |
| WO | WO 03/084146 A1 | 10/2003 |

OTHER PUBLICATIONS

The Bluetooth Special Interest Group, Specification of the Bluetooth System, vol. 1 & vol. 2, Core and Profiles: Version 1.1, Feb. 22, 2001.

O'Donnell et al., "An Integrated, Low Power, Ultra-Wideband Transceiver Architecture for Low-Rate, Indoor Wireless Systems", Dept. of Electrical Engineering & Computer Science, University of California, Berkeley, Berkeley, CA, 8 pgs.

P. I. I. Withington, et al., "An Impulse Radio Communication System", "Proceedings of the International Conference on Ultra-Wideband, Short Pulse Electromagnetics", (ISBN 0-306-44530-1), Oct. 19, 1992, pp. 113-200.

J. Bray and C. Sterman, "Bluetooth 1.1-Connect Without Cables", Prentice Hall Inc., Upper Saddle River, NJ 1002 (ISBN 0-13-066106-6), Sects. 5.4., pp. 70-78.

D. J. Costello, Jr., et al., "Applications of Error-Control Coding", IEEE Transactions of Information Theory, Oct. 1998, vol. 44, pp. 2531-2560.

Communication (May 24, 2005); EP Search Report (May 11, 2005).

Communication (May 24, 2005); EP Search Report (Apr. 29, 2005).

PCT Search Report, Oct. 10, 2005, 6 pages.

* cited by examiner

ULTRA-WIDEBAND/LOW POWER COMMUNICATION HAVING A DEDICATED REMOVABLE MEMORY MODULE FOR FAST DATA DOWNLOADS—APPARATUS, SYSTEMS AND METHODS

RELATED APPLICATION

Ser. No. 10/660,544, entitled "UWB Link Setup With Bluetooth", filed contemporaneously with the present invention, assigned to the assignee of the present invention, and fully incorporated herein by reference.

Ser. No. 10/660,549, entitled "Repeat request in Hybrid Ultra Wideband—Bluetooth Radio", filed contemporaneously with the present invention, assigned to the same assignee of the present invention, and fully incorporated herein by reference.

BACKGROUND OF THE INVENTION

1. Field of the Invention

This invention relates to communication systems, methods and program products. More particularly, the invention relates to low power communication in a mobile environment for fast data downloads—apparatus, systems and methods.

2. Description of Prior Art

Ultra Wideband (UWB) is a wireless technology for transmitting digital data over a wide spectrum of frequency bands with very low power. Data can be transmitted at very high rates and can carry huge amounts of data over a short distance at very low power. Instead of traditional sine waves, UWB broadcasts digital pulses that are timed very precisely on a signal across a wide spectrum at the same time. Transmitter and receivers must be coordinated to send and receive pulses with an accuracy of trillionths of a second. Advantageously, UWB is not subject to multipath by time gating the receiver to allow it to ignore signals arriving outside the gating interval.

When transferring data by UWB, the receiver device might become the bottleneck for data transfer, particularly in hand held communication devices where communication busses are not optimized for very fast data transfer within the device. Moreover, memory speed and capacity of such devices may not be sufficient to handle trains of data pulses at high data rates for large data transfers.

To advance the technology state of handheld held communication devices for ultra fast download using UWB, it would be desirable to equip such devices with a high speed, high capacity portable memory and a UWB transceiver for large data transfers at transmission rates up to 1 Gbits per second. The portable memory may be in the form of a removable memory or memory stick including a memory and UWB transceiver coupled to a terminal, typically a handheld device or laptop. However, current FCC regulations described in FCC, First Report and Order, FCC 02-48, dated Feb. 14, 2002 require that UWB type of radios may only transmit when connected to a receiver to limit interference with other receivers. It would be desirable to have a first low power communication device establish a short-range control link with a second low power communication device for controlling a second, significantly faster, short-range communication link between the devices for UWB transmissions according to FCC requirements.

Prior art related to the subject matter of the application includes:

(1) U.S. Pat. No. 5,687,169 entitled "Full Duplex Ultrawide-Band Communication System And Method", issued Nov. 11, 1997, discloses an impulse radio transceiver for full duplex ultrawide-band communications. The transceiver comprises an impulse radio transmitter to transmit impulse radio signal pulses, an impulse radio receiver to receive impulse radio signal pulses. Either or both of the impulse radio transmitter and the impulse radio receiver, synchronizes the transmission and the reception of the impulse radio signal pulses for pulse interleaved communications. Pulse interleaving avoids self-interference between the transmitted impulse radio signal pulses and the received impulse radio signal pulses. In addition to pulse interleaved communications, bursts of pulses can be transmitted between two transceivers in an interleaved fashion. Alternatively, two different pulse repetition rates are be used to transmit and receive impulse radio signal pulses simultaneously. Still further, selected pulses of the received or transmitted impulse radio signal pulses are blanked to avoid interference.

(2) U.S. Pat. No. 6,587,949 entitled "Secure Storage Device For Transfer Of Data Via Removable Storage", issued Jul. 1, 2003, discloses a secure storage device with the identical external dimensions, form factor and hardware connectivity configuration of a standard removable storage device, for securing digital data such as digital images from digital cameras at the acquisition stage. Original digital camera data is saved in the memory of the secure storage device after performing one or more security functions, including encryption, creation of an authentication file, adding data to the image data such as fingerprinting, and adding secure annotations such as separate data included in an image header. These processes are transparent to a host device receiving secure data from the storage device because standard protocol is used to write to the secure storage device. The device prepares original authentication data from original digital camera data, and encrypts and stores both the original authentication data and the original image data. The use of the device includes reading the original image data on a separate computer, by means of direct downloading of the data and or mounting the removable storage device on the computer. The computer is able to read data on the raw transfer level as if the device is a standard unsecured storage device. On the content level, the data remains secure. The computer can be programmed with software whereby the encrypted original authentication data can be decrypted by a user having a password key. Additional software may enable the computer to verify the authentication data of the image data for questionable authenticity. The secure storage device secures data from any computerized device that stores data on a removable storage device, such as a portable computer.

None of the prior art discloses ultra-fast downloading of data to terminals in a mobile environment using a low power communication control link to control a significantly faster UWB data link between the terminals for data transfer to a dedicated memory stick including a high capacity memory and UWB transceiver devices.

INVENTION SUMMARY

In a mobile environment, a mobile device includes an attached memory stick (removable memory) having a high speed—memory and storage with direct memory access embodied in an integrated circuit chip coupled to an ultra-wideband (UWB) transceiver, all of the elements mounted on a supporting member. The mobile device communicates with other like base devices, portable or stationary, via UWB transmissions using pulse bursts up to 1 Gbits per second. One possibility is that the modulating signal changes the pulse repetition rate in proportion to the modulation to transmit data. In one possible implementation, the receiving device demodulates the pulse burst using a cross correlator and demodulator. The receiving device accesses the data in the memories of the memory stick. The data transfers between the devices occur in the simplex or duplex mode, after a low power communication connection is established between the devices. The communication link between the devices is in the range of 10-20 meters. The communication system allows existing device bus interfaces (which are much slower than ultra-wideband transmissions) to communicate between the fast read/write cycles of the memories integrated within the memory stick. In one embodiment, Bluetooth (BT) protocol may be used to establish a connection between the devices to activate their UWB transceivers for data transfers. A host controller interface (HCI) for a sending device sends a create connection request to the Link Manager (LM) and provides enhanced BT parameters. The create connection command causes the device to enter a paging mode and send out paging packets including the device's address. A receiving device configured to perform page-scanning responds with its own address. Subsequently, a low power connection is established between the sending and receiving devices, and Link Manager Protocol (LMP) is entered by the devices. The sending LMP requests BT parameters; a UWB indication and other information. The receiving LMP responds with the requested information. The sending LMP transmits a host connection request to the receiving device. The receiving host accepts the request. The sending LMP sends a setup complete message which is returned by the receiving LMP. The sending LMP sends a connection complete message to the sending host. The receiving LMP sends a connection complete message to the receiving host. The sending LMP sends a "switch to UWB" message to the receiving LMP. The receiving LMP sends an accepted message to the sending LMP and UWB transmission commence after the sending UWB transmitter and receiving UWB receiver lock on to and synchronize with one another. In one preferred embodiment, the sending device can use heavy precalculated error coding allowing the receiving device to perform simple parity checking for data integrity. Upon completion of the transmission, the receiving base device may process the data over its bus interface at slower rates than the received transmission. Duplex transmission can occur by pulse interleaving sending side transmitters and receiving side transmitters.

In one aspect, a first low power radio link controls a second, significantly faster radio link to keep the throughput of the second radio link optimized.

In another aspect, ultra fast down load of data to mobile devices, via UWB, is facilitated by an attached dedicated memory stick including a high capacity memory and a UWB transceiver.

In another aspect, a first radio channel serves as a control channel for a UWB data link setup and frees the very fast UWB link from link control overhead.

In another aspect, the UWB serves as a direct data channel for the actual data payload without unnecessary overhead.

In another aspect, there is no need to change the direction of the "flow" of the communication (receiver side sending ACKs to transmitter side), which leads to significant improvement of the throughput of the very fast UWB communication link.

In another aspect, the UWB direct channel link avoids data transfer loss if basic throughput is very large, and there is a need to make time-consuming adjustments such as a TX/RX switch.

DESCRIPTION OF DRAWINGS

The invention will be further understood from the following description of a preferred embodiment taken in conjunction with appended drawings, as follows.

DESCRIPTION OF PREFERRED EMBODIMENT

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
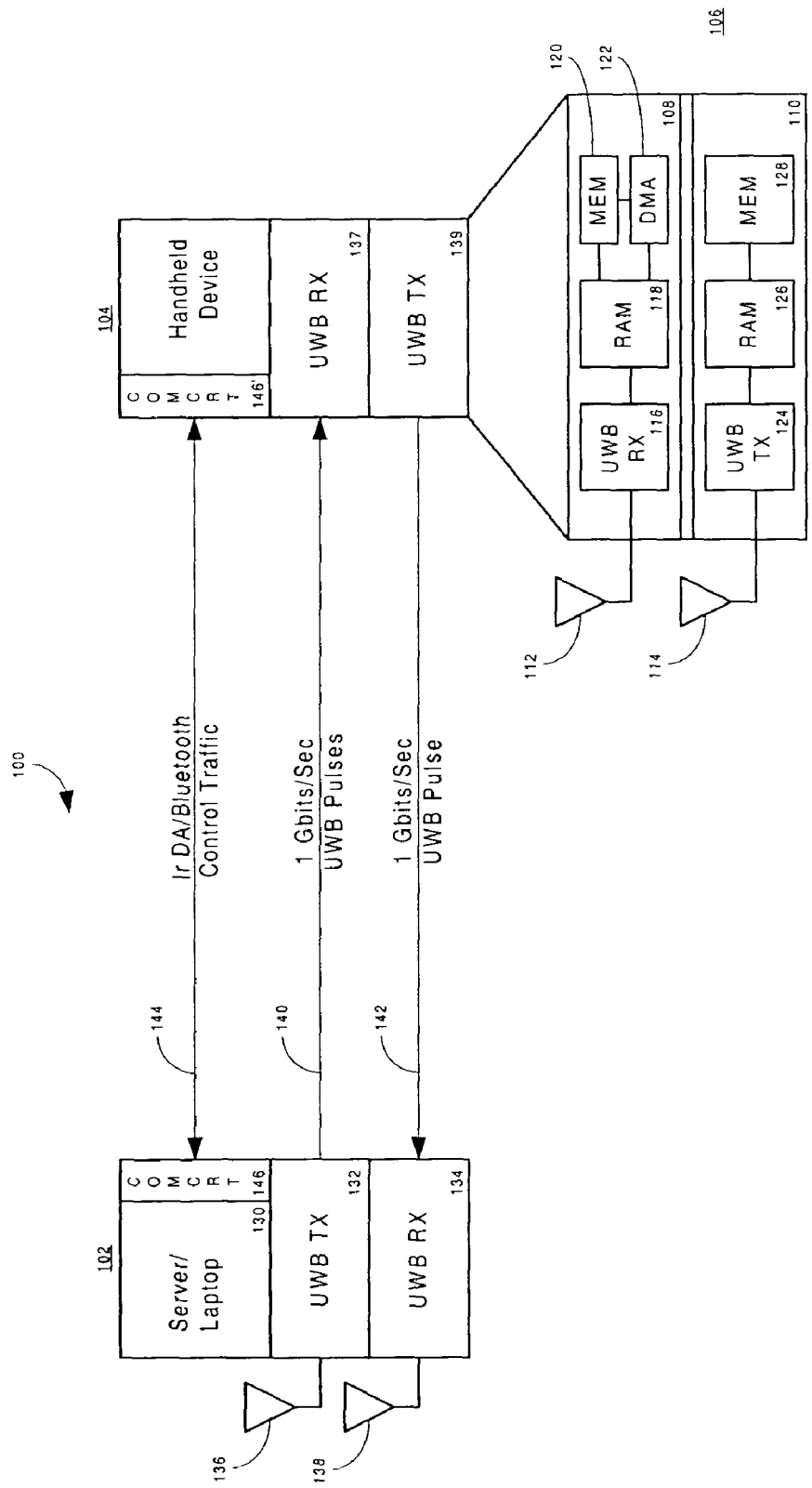
FIG. 1 is a representation of a mobile environment for high data transfer between sending/receiving terminals with at least one dedicated memory stick via UWB transmissions and low power communication for control purposes, according to the principles of the present invention.

FIG. 1 is an overview of an ultra wide band (UWB)/low power communication system 100 for high bandwidth duplex data transactions between a first terminal 102, typically a base device, stationary or portable and a second terminal 104, typically a hand-held device using UWB transmissions occurring at up to 1 Gbit per second embodying the present invention.

The terminal 102 includes stationary or portable device 130 including, for example, a server linked to an access point (not shown) or a laptop computer. The stationary or portable terminal includes a UWB transmitter 132 and a UWB receiver 134, each linked to separate antennas 136 and 138, respectively. Data transfer between the terminals 102 and 104 occurs over airlinks 140 and 142 at up to 1 Gbit per second after a connection is established between sending and receiving terminals via a low power control circuit 144 connection, typically Bluetooth or IrDa.

The terminal 104 in FIG. 1 includes a detachable or removable memory-transmitter/receiver 106 for fast download of data from UWB transmissions provided by the terminal 102. One embodiment of the removable memory-transmitter/receiver may be a memory stick 106 (currently available from several manufacturers including Sony Corp., Tokyo, Japan). The memory stick is supplemented with a UWB transmitter/receiver (currently available from several manufacturers including Motorola, Inc. Schaumburg, Ill.). More particularly, the general requirements for the memory stick include a memory means with or without a processor; a direct connection to a UWB receiver and/or UWB transmitter, and an interface/contact that connects the stick with another device. In the present instance, the memory stick 106 includes a receiver section 108 and a transmitter section 110. Each section is coupled to separate antennas 112, 114, respectively.

The receiver section 108 includes a UWB receiver 116, coupled to the antenna 112 and providing an output to a high-speed RAM 118 and a storage memory 120, both under the control of a direct memory access (DMA) circuit 122 for storing the data received from the UWB receiver and for subsequent transfer to the handheld device 104.

The transmitter section 110 includes a UWB transmitter 124 coupled to the antenna 114 and receiving data from a RAM 126 or memory 128.

The airlink connections 140 and 142 are setup with the control of a low power communication link 144 between the terminals 102 and 104. Both terminals include a low-power communication transmitter/receiver unit 146, 146$^1$ which may use any short-range communication technology or protocol including, but not limited to communication protocols compatible with IEEE 802.11x, IEEE 802.15, IrDa or HIPERLAN.

Figure 2B:
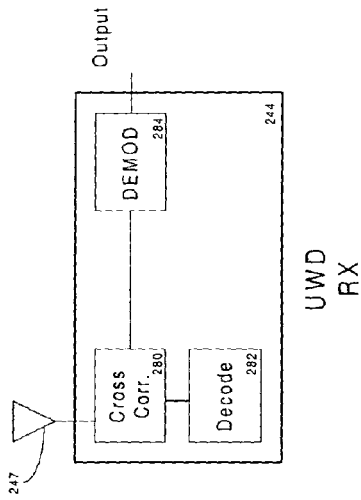
FIG. 2B is a representation of an example embodiment of a UWB receiver incorporated in the memory stick of FIG. 2.
Figure 2A:
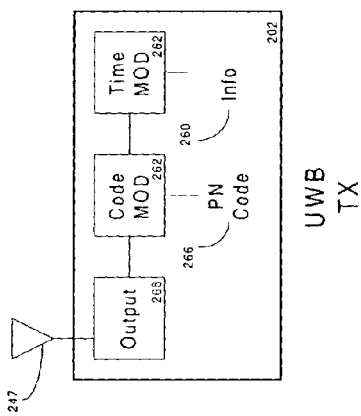
FIG. 2A is a representation of an example embodiment of a UWB transmitter incorporated in the memory stick of FIG. 2.
Figure 2:
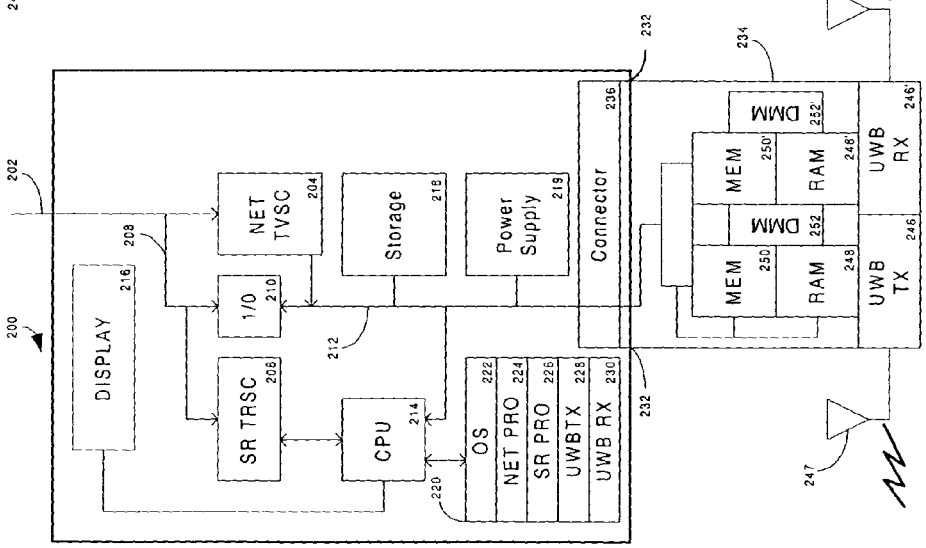
FIG. 2 is a representation of an example embodiment of a mobile device including a memory stick with a UWB transmitting/receiving device in FIG. 1.

FIG. 2 discloses an example embodiment of a hand-held terminal 200, which provides additional details on the handheld terminal 104 of FIG. 1. The terminal 200 includes a dual antenna 202 linked to a cellular network transceiver 204 and a low-powered or short-ranged transceiver 206, via a communication circuit 208. It should be noted that the terminal 200 may also include more than on short-ranged transceiver, such as, for example a Bluetooth transceiver and an IrDa transceiver. An I/O circuit 210 connects the communication circuit to a bus interface 212 serving a CPU 214 coupled to a display 216; a storage unit 218, a power supply 219 and a RAM 220. A series of programs and applications are stored in the RAM including, for example, an operating system 222; cellular network protocols 224; short range protocols 226; UWB transmitter routines and protocols 228 and UWB receiver routines and protocols 230.

The device 200 includes a slot 232 within the frame (not shown) for receiving a detachable or removable memory-UWB/transmitter/receiver 234 via a connector/interface 236 connected to the interface bus 212. The removable memory includes UWB transmitter 246 and receiver 246', each coupled to separate antenna 247, 247', respectively and RAM devices 248, 248', respectively. The RAM devices 248, 248' are coupled to xGb memories 250 and 250', both the Rams and memories being serviced by DMA circuits 252 and 252', respectively.

The UWB transmitter 246 is shown in FIG. 2A in more detail. An information signal 260 is provided to a time based modulator 262 and modulates a timing signal. The modulated timing signal is provided to a code modulator 262, responsive to a pseudo noise code 266, and outputs code modulated time based signals to an output stage 268, which is triggered to emit signal pulses containing bursts of data with parity at the antenna 247.

FIG. 2B discloses the UWB receiver 247' in more detail. The transmitted signal pulses are captured by the antenna 247' and provided to a cross-correlator 280. A decode timing modulator 282 generates a decode signal corresponding to the PN code used by the transmitter 246. The cross-correlator bundles the decode signal with the received signal and generates a baseband signal for demodulation by a demodulator 284. The demodulated signal is substantially the same as the information signal provided to the transmitter. Further details on the UWB transmitter and receiver are described in an article entitled, "Impulse Radio Communication System", by P. I. I. Withington, et al., published in the "Proceedings of the International Conference on Ultra-Wideband, Short Pulse Electromagnetics", pgs. 113-200, Oct. 19, 1992.

Figure 3:
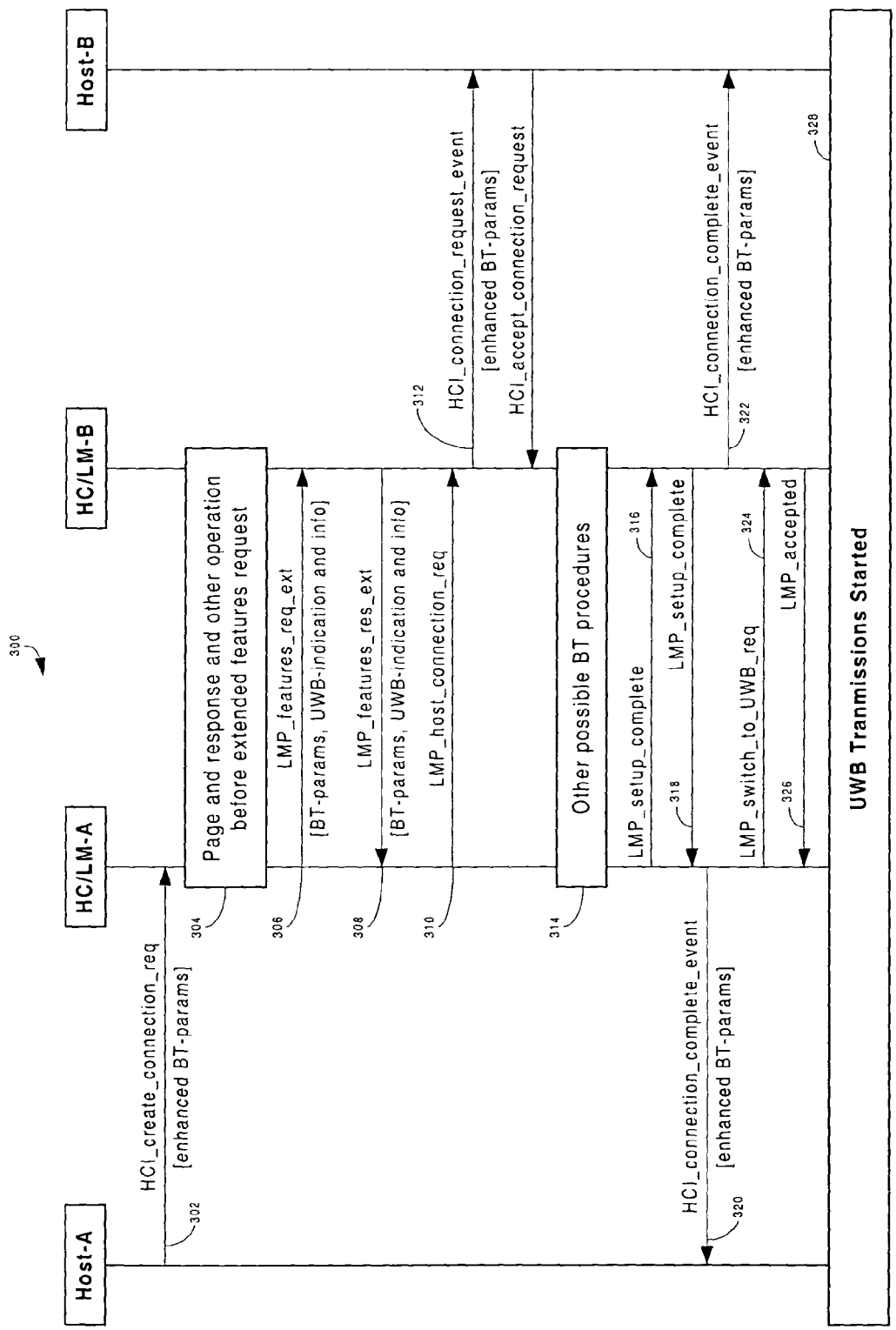
FIG. 3 is a representation of message flow for setting up a control circuit for the sending and receiving terminals of FIG. 1 according to one embodiment of the present invention.

Returning to FIG. 1, according to current FCC requirements UWB transmission may only occur when UWB transmitter and receiver are associated with one another and synchronized. When interpreting the FCC report, a UWB connection cannot occur because the communication parameters cannot be determined without an exchange of information to synchronize the transmitter and receiver. One method to satisfy the FCC requirements of transceiver-receiver association is to establish a low-power connection between UWB sending/receiving terminals as a control circuit for transferring UWB parameters between the terminals to synchronize the terminals for transmissions. Any number of low power communication systems can be used to serve as a control circuit between UWB terminals, including, for example, Bluetooth, ZigBee, WLAN, IrDA, cellular and the like. In one embodiment, a Bluetooth (BT) protocol may be used to establish a connection between the terminal to activate their UWB transceivers for data transfers, as will be described in conjunction with the message flow diagram in FIG. 3, illustrating one embodiment of the present invention.

In step 302, Host A activates the Host Controller Interface (HCl) to send a create connection request to the Link Manager—A (LM-A) including enhanced BT parameters for UWB transmissions. Step 304, causes the LM-A to enter a paging mode and send out paging packets, including the Host A's address. A receiving device host B, configured to perform page-scanning responds with its own address via LM-B. Subsequently a low-powered connection is established between Host A and Host B, and Link Manager Protocol (LMP) is entered by the host devices. Step 306 causes the LM-A to request BT parameters; a UWB indication and other information from Host B. Step 308 causes LM-B to provide the requested information, including a UWB indication. Step 310 causes LM-A to transmit a host connection request to LM-B, and A connection request is forwarded to Host B, via the host controller interface and providing the enhanced BT parameters. Host B accepts the connection request in Step 312. Other possible Bluetooth procedures are executed in Step 314 including providing UWB synchronizing data at this time. LM-A sends a setup complete message to LM-B in Step 316. LM-B responds with setup complete message in Step 318. Step 320 causes the HCl to send a connection complete message with enhanced BT parameters to Host A. A host controller interface complete message is sent to Host A by the LM-A, including the enhanced BT parameters in step 320. LM-B in step 322 sends a host controller interface connection message complete event to Host B, including the enhanced parameters. LM-A sends a switch to UWB requests to LM-Br in step 324, and LM-B responds with an accepted message in step 326. UWB transmissions start in step 328 based upon synchronizing parameters exchanged by the sending and receiving UWB transceiver 132/139 or 137/134.

Further details on Bluetooth protocols for setting up a link connection between host devices are described in the text "Bluetooth 1.1-Connect Without Cables", J. Bray and C. Sterman, published by Prentice Hall Inc., Upper Saddle River, N.J. 1002 (ISBN 0-13-066106-6), Sects. 5.4.

Figure 4:
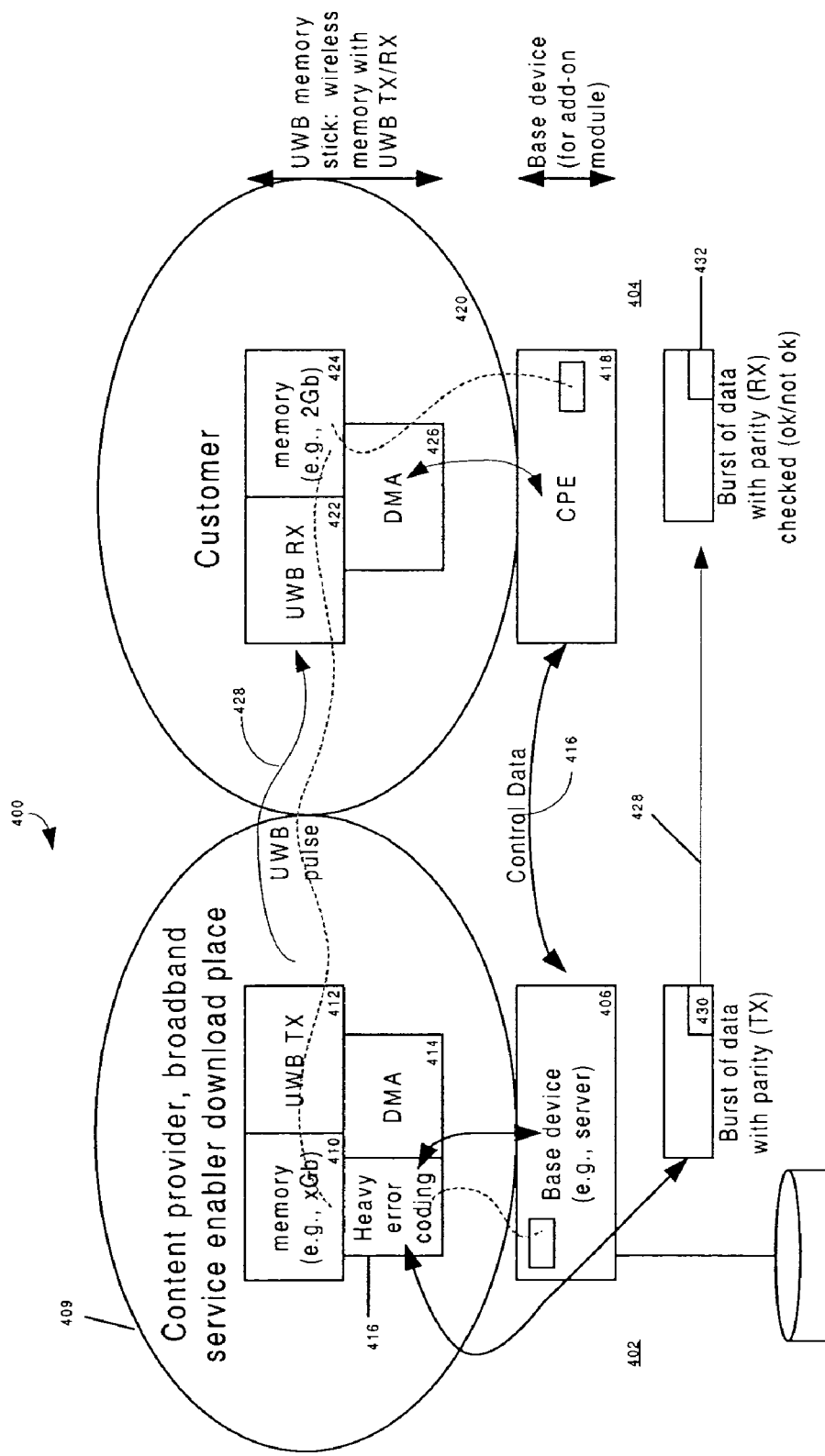
FIG. 4 is a representation of ultra fast data download from a server to a customer, via dedicated memory sticks, with high capacity memory and UWB transceivers and a low power communication circuit for control purposes in establishing a UWB connection between the server and customer according to one embodiment of the present invention.

FIG. 4 describes an example system 400 for transfer of data from a content provider 402 to a customer 404, via UWB transmissions occurring in bursts of data according to one embodiment of the present invention. The content provider includes a base device 406, typically a server coupled to a database 408 and an attached memory stick 409. The memory stick includes a xGb memory device 410 for transfer of data from the database to a UWB transmitter 412. It should be noted that the content provider does not necessarily need to have a memory stick for performing UWB data transfer because a data bottleneck occurs on the receiver side. Instead content providers providing large contents to mobile users can use UWB transmitters integrated into the base device. A direct memory access device 414 services the database to download the memory 410, via an error coding unit 416 performing precalculated heavy error coding using, for example, linear block codes, such as single-error correcting/error detecting codes described in an article entitled, "Applications of Error-Control Coding", by D. J Costello, Jr., et al., published in the IEEE Transactions of Information Theory, October 1998, pgs. 2531-2560. It is preferred that the heavy error coding be performed on the transmitter side, i.e. content provider, because there the error coding can be done all the time, while receiver side (mobile terminal) can be optimized so that there are no unnecessary calculation burden for the device.

The customer 404 receives data from the server 406 via customer premise equipment (CPE) 418 which may be any mobile terminal equipment residing on the customer's premises for data utilization purposes. A memory stick 420 is attached to the equipment 418 and includes a UWB receiver 422 coupled to a xGb memory 424 for data storage. A direct memory access circuit 426 services the receiver in transfer data to the memory and the transfer of data to the equipment 418. The transfer of the data to the CPE occurs at the cycle speed of the CPE while the receiver 422 receives data up to 1 Gbit/sec in rapidly occurring pulses having pulse widths in the range of 20-0.1 nanoseconds.

The server 406 establishes a low power communication control circuit 416 with the customer premise equipment 418, using, for example, the communication protocol, described in FIG. 3 for the transfer of BT parameters and UWB parameters. It should be understood that also other low power communication protocols are available to establish a control circuit for the transfer of parameters between the server and the CPE for control of data transmission and that the present invention is not limited to for example Bluetooth.

UWB transmissions 428 from the server to the CPE occur after synchronization of the transmitter 412 and the receiver 422. The bursts of data 428 occur with parity 430 due to the heavy error coding in the server. The bursts of data are received at the customer premise equipment and is error detected by simple parity checking, which reduces the processing power required by the customer premise equipment.

Figure 5:
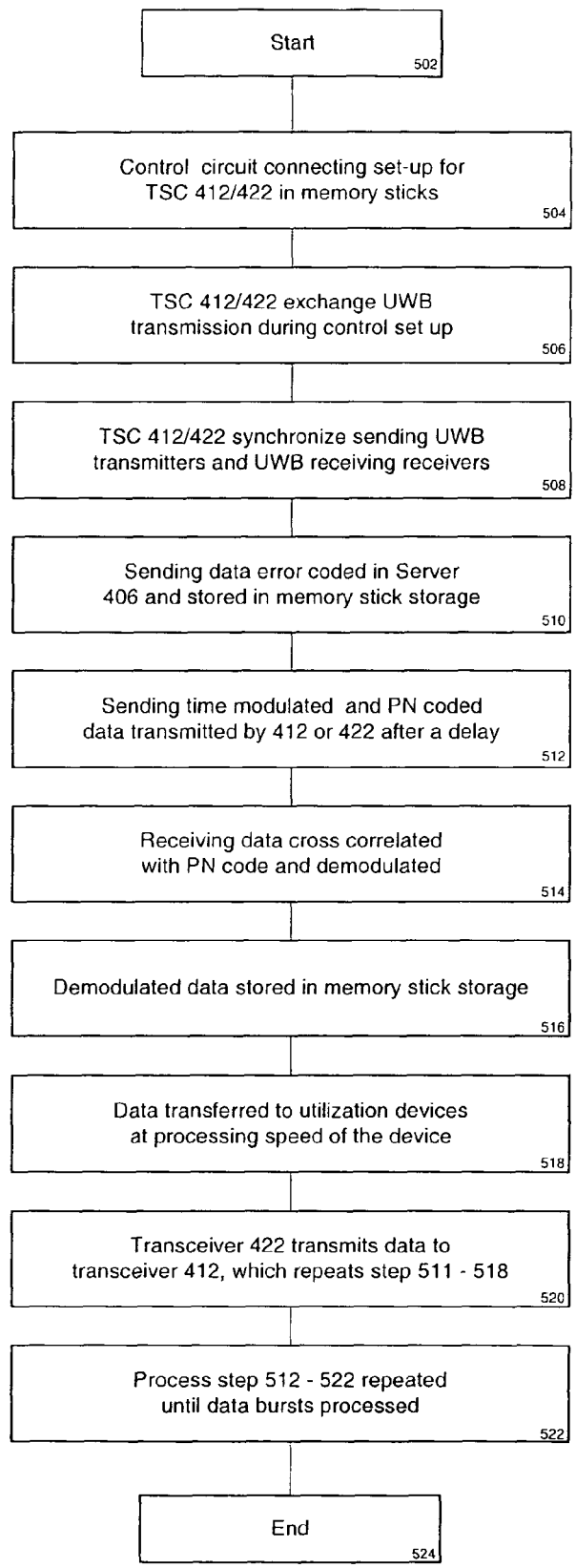
FIG. 5 is a flow diagram describing duplex communication between a sending and a receiving device for ultra fast downloads between the devices after establishment of a low power control circuit between the devices for controlling a UWB connection between the devices, according to FIG. 1.

While FIG. 4 has described data transfer between the server 406 and the customer premise equipment 418 in terms of simplex mode, the memory sticks 409 and 420 can be modified to substitute transceivers for transmitter 412 and receiver 422 and operate in a duplex mode, as shown in FIG. 5 and described in conjunction with FIG. 4, as follows:

Step 502: Duplex mode operation is entered for the transceivers 412/422 in memory sticks 409/420, respectively.

Step 504: A control circuit connection is initiated by the server 406 with the CPE 418 for the transceivers 412/422 using a low power communication protocol, for example the Bluetooth protocol described in FIG. 3.

Step 506: After control setup, transceivers 412/422 exchange UWB transmission rates and other information for synchronization purposes.

Step 508: Transceivers 412/422 synchronize sending transmitters and receiving receivers for data transfer.

Step 510: Data is transferred from the database 408 to the memory 410 via the error coding unit 416 and subjected to precalculated heavy error coding.

Step 512: Transceiver 412 sends time modulated and PN coded data to transceiver 422, after a delay period equal to the transmission period for the transceiver 422.

Step 514: Transceiver 422 correlates the received pulse with the PN code for demodulation.

Step 516: Transceiver 422 stores the demodulated data in the memory 424 under direction of the DMA after simple parity checking.

Step 518: CPE 418 transfers the demodulated data to a data utilization device at the processing speed of the CPE.

Step 520: Transceiver 422 transmits data to transceiver 412 from memory 424 under direction of DMA 426 after transceiver 412's delay period and heavy error coding of the data to be transmitted. Transceiver 422 repeats Step 512. Transceiver 412 repeats Steps 514-518

Step 522: Process steps 512-522 are repeated by transceivers 412/422 until all data bursts are processed.

Step 524: The process ends when the control connection between the server and the customer premise equipment is terminated and the UWB transceiver 412/422 are turned off.

Summarizing, the present invention provides a high-speed memory and a UWB transceiver installed in a dedicated memory stick connected to a stationary or portable terminal for high-speed data transfer between terminals, typically in a mobile environment. The high speed memory captures UWB transmitted data up to 1 Gbit/sec and allows an existing bus interface in the attached terminal, typically slower than UWB transmission, to communicate between fast read/write cycle of the memories integrated with the UWB transceivers. The invention, broadly interpreted describes a low-power radio link to control a second significantly faster radio link to keep the throughput of the second radio link optimized. The first radio channel frees the very fast second radio link from link control overhead. The second faster radio link serves as a direct data channel for actual data payload. No unnecessary overhead is transmitted through the second data link and there is no need to change the direction of the flow of the receiver side sending acknowledgements to the transmitter side. The direct data channel provides significant improvement from the throughput for the very fast communication link, and eliminates time-consuming adjustments, such as, transceiver/receiver switching where possible loss of data occurs.

While the invention has been described in a preferred embodiment, various changes can be made without the parting of the spirit of the scope of the invention, as described in the appended claims, in which,

We claim:

1. A method in a terminal device, comprising:
    a) establishing, by said terminal device, a first wireless communication link including control information with another device; b) establishing a second higher data rate wireless communication link with the another device, said second link operating at a higher data rate than said first link; and c) controlling communication of the second higher data rate wireless communication link, wherein the first wireless communication link frees the second higher data rate wireless communication link from link control overhead by using the first wireless communication link as a control channel for the second wireless communication link.

2. The method of claim 1 wherein the second higher data rate wireless communication link is established based on information communicated via the first wireless communication link.

3. A method, comprising:
a) attaching to a mobile device a removable memory module including integrated memories and an ultra-wideband (UWB) transceiver;
b) establishing a wireless low power communication link using link manager protocol data for exchanging UWB parameters between the mobile device and a base device having base integrated memories and a base UWB transceiver, said low power link operating at a lower data rate than said ultra-wideband (UWB) transceiver;
c) initiating an ultra wideband transmission between the mobile device and the base device based on the exchanged UWB parameters;
d) wherein no link manager protocol data is transmitted in the ultra wideband transmission and there is no change in the direction of a data transfer flow of a receiver side eliminating sending acknowledgements to a transmitter side.

4. The method of claim 3, further comprising:
e) transmitting data from the base device to the removable memory module via the ultra wideband transmission link for storage in the integrated memories of the removable memory module;
f) forwarding the transmitted data from the removable memory module to the mobile device memories through a connector and a bus interface; and
g) processing the transmitted data in the mobile device.

5. The method of claim 4 further comprising:
h) requesting an acknowledgement from the mobile device via the low power communication connection before each sequential ultra wideband transmission.

6. The method of claim 5 further comprising:
i) performing pulse repetition rate and PN code modulation of a UWB transceiver to transmit data.

7. The method of claim 6 further comprising:
j) storing transmitted data in the integrated memory of the receiving device.

8. The method of claim 7 further comprising:
k) performing precalculated heavy error coding of the transmitted data prior to transmitting said data.

9. The method of claim 8 further comprising:
l) performing simple parity checking of received transmitted data.

10. A method, comprising:
a) attaching to a mobile device a removable memory module including an integrated memory and ultra wideband (UWB) transmitter and receiver which captures UWB transmitted data up to 1 Gbit/second;
b) establishing a base device including an integrated memory and a base UWB transmitter and receiver;
c) initiating a low power communication connection including control information between the mobile device and the base device, said low power connection operating at a lower data rate than said ultra-wideband (UWB) transmitter and receiver;
d) exchanging UWB parameters between the devices via the low power communication connection freeing the UWB transmitter from link control overhead by using the low power connection as a control channel for the base device;
e) activating the mobile device UWB transmitter for transmitting data as modulated pulse trains to the base device receiver;
f) demodulating the mobile device UWB transmitter pulse trains in the base device UWB receiver;
g) transmitting from the base device UWB transmitter to the mobile device UWB receiver, modulated pulse trains of the base device UWB transmitter interleaved between the modulated pulse trains of the mobile device UWB transmitter; and
h) demodulating the modulated pulse trains of the base device UWB transmitter in the mobile device UWB receiver.

11. The method of claim 10 wherein the low power communication connection is a Bluetooth connection.

12. The method of claim 11 wherein the integrated memories comprise a high-speed memory with direct memory access.

13. The method of claim 12 wherein the base device is another mobile device attached with a removable memory module.

14. Apparatus comprising:
a) means for establishing a first radio link including control information between first and second terminals;
b) means for establishing a second higher data rate radio link between the terminals for data throughput, said second link operating at a higher data rate than said first link; and
c) means for controlling communications of the second higher data rate radio link via the first radio link wherein the first radio link frees the second higher data rate radio link from link control overhead by using the first radio link as a control channel for the second higher data rate radio link.

15. The apparatus of claim 14 wherein the second higher data rate radio link serves as a direct data channel for actual data payload.

16. The apparatus of claim 14 wherein there is no change in the direction of the flow to a receiver side eliminating sending acknowledgements to a transmitter side.

17. The apparatus of claim 16 wherein the direct data channel eliminates time-consuming adjustments due to transceiver/receiver switching where possible loss of data occurs.

18. The apparatus of claim 14 further comprising:
d) means including a high capacity memory and an ultra wide band (UWB) transceiver attached to a terminal for capture of data at high speed and transfer to a utilization device at lower speeds.

19. Apparatus, comprising: a) a first control circuitry; b) a first memory; c) low power communications means for communicating over a wireless low power communication link; d) data bus circuitry interconnecting a first processor, the first memory and the wireless low power communication link; and e) a detachable memory unit connectable to the data bus circuitry through a connector interface, comprising: i) a second control circuitry; ii) an ultra wide band (UWB) receiver for receiving data over a UWB communication link, said UWB link operating at a higher data rate than said low power link; iii) a second memory for temporarily storing the received data, and iv) a circuit means connecting a second processor, the UWB receiver and the second memory together with the data bus circuitry through the connector interface, wherein the wireless low power communication link controls the UWB communication link to keep data receiving rate of the UWB communication link optimized by freeing the UWB communication link from link control overhead by using the wireless low power communication link as a control channel for the UWB communication link.

20. The apparatus of claim 19 further comprising:
f) a UWB transmitter connected to the circuit means for transferring data over the UWB communication link.

21. The apparatus of claim 19 further comprising:
g) display means connected to the first control circuitry.

22. The apparatus of claim 19 wherein the low power communication means is taken from the group consisting of Bluetooth, IrDa, HIPERLAN, WLAN, ZigBee, IEEE 802.11x, and IEEE 802.15.

23. Apparatus, comprising:
a processor;
a first wireless transceiver module coupled with the processor for establishing a first radio link including control information with another device; and
a second wireless transceiver module coupled with the processor for establishing a second higher data rate radio link with the another device, said second link operating at a higher data rate than said first link;
wherein the processor is configured to control the operation of the first and second wireless transceiver modules so that the first radio link controls the second higher data rate radio link freeing the second higher data rate radio link from link control overhead by using the first radio link as a control channel for the second higher data rate radio link.

24. The apparatus of claim 23, wherein the processor is further configured to control the operation of the first and second wireless transceiver modules so that the second higher data rate radio link is established based on information communicated via the first low-power radio link.

25. A method in a terminal device, comprising:
establishing, by said terminal device, a first wireless communication link including control information with another device;
establishing a second wireless communication link with the another device as a direct channel; wherein the second communication link is an ultra-wideband communication link, said second link operating at a higher data rate than said first link, and
controlling communication of the second wireless communication link by using the first wireless communication link as a control channel for the second wireless communication link, whereby the first wireless communication link frees the second wireless communication link from link control over head for direct data transmission by using the first wireless communication link as a control channel for the second wireless communication link.

* * * * *